Nov. 20, 1923.

T. R. WATSON

GAS SAVER AND COASTER BRAKE

Filed Oct. 6, 1921

Thomas R. Watson
INVENTOR

WITNESSES
Frank B. Cook
H. T. Chapman

BY E. G. Siggers
ATTORNEY

Nov. 20, 1923.
T. R. WATSON
1,474,570
GAS SAVER AND COASTER BRAKE
Filed Oct. 6, 1921  2 Sheets-Sheet 2
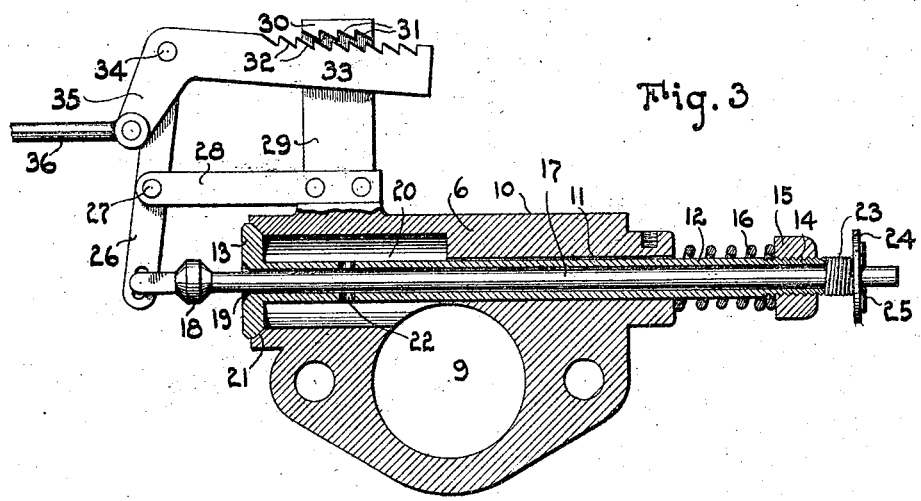
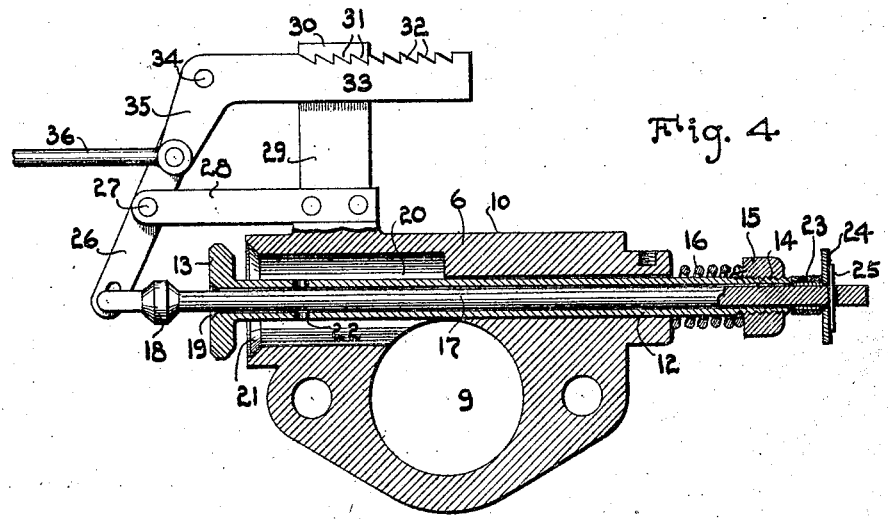
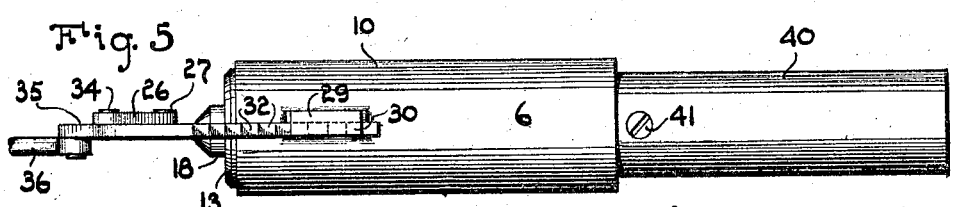
Thomas R. Watson
INVENTOR Patented Nov. 20, 1923.

1,474,570

UNITED STATES PATENT OFFICE.

THOMAS R. WATSON, OF MONTEREY, CALIFORNIA.

GAS SAVER AND COASTER BRAKE.

Application filed October 6, 1921. Serial No. 505,958.

*To all whom it may concern:*

Be it known that I, THOMAS R. WATSON, a citizen of the United States, residing at Monterey, in the county of Monterey and State of California, have invented a new and useful Gas Saver and Coaster Brake, of which the following is a specification.

This invention has reference to gas savers and coaster brakes for automobiles, and its object is to provide an attachment for the carbureter of an automobile engine whereby an extra amount of air may be introduced into the carbureter course to effect an economizing of the fuel, and also whereby larger amounts of air may be introduced into the engine cylinders to act as a brake in coasting down hill to check the speed of the automobile.

In accordance with the invention, there is provided an attachment for inclusion with the carbureter between the latter and the intake of the engine, whereby the charges furnished by the carbureter may, at will, be intercepted by a greater or less amount of air to dilute the charges, thereby economizing the quantity of fuel required. The same apparatus is susceptible of manipulation to increase the amount of air taken into the engine, whereby the latter operates after the manner of a pump retarding the reciprocation of the pistons and preventing explosions from taking place but causing a pumping action of the pistons resisting the rotation of the engine, whereby a brake effect is caused.

The invention will be best understood from a consideration of the following detailed description taken in connection with the accompanying drawings forming part of this specification, with the understanding, however, that the invention is not confined to any strict conformity with the showing in the drawings, but may be changed and modified so long as such changes and modifications mark no material departure from the salient features of the invention as expressed in the appended claims.

In the drawing:

Fig. 3 is a view similar to Fig. 2, but showing the intake valve of smaller size open for fuel economizing.

Fig. 4 is a view similar to Fig. 3, showing the parts in braking position.

Fig. 5 is a top plan view of the structure, as shown in Fig. 2.

Figure 1:
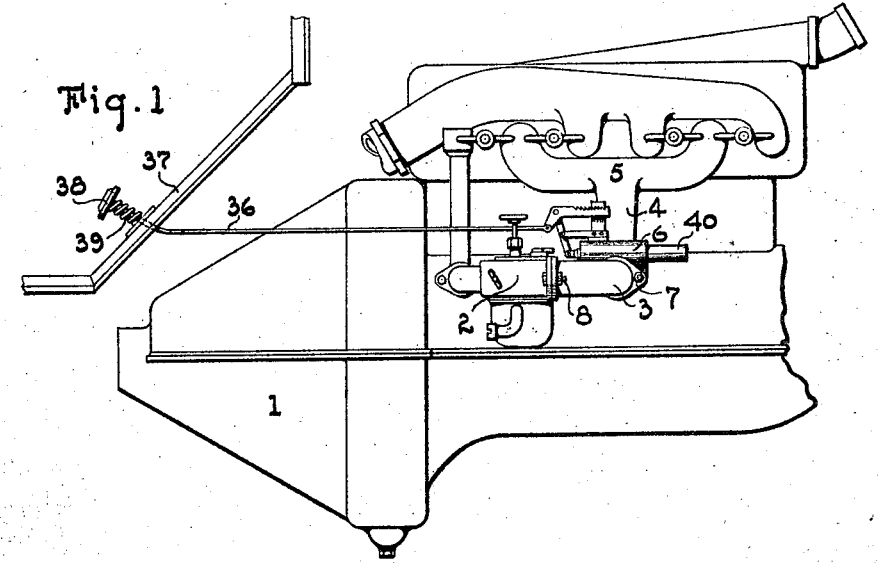
Fig. 1 is a side elevation of an automobile engine equipped with the invention.

Referring to the drawings, and particularly to Fig. 1, there is shown an automobile engine 1 of familiar type, provided with a carbureter 2 also of familiar type, and therefore requiring no special description. The carbureter is connected by a bend 3 to the intake end 4 of an intake manifold 5. Between the bend 3 and the intake end 4 of the manifold 5, there is located a body or block 6 having coupling flanges 7 by which the outlet end of the carbureter may be joined to the manifold 5 by bolts 8. The block 6 is formed with a passage 9 through it in the line of travel of the enriched charges coming from the carbureter. The block 6 has an elongated portion 10 with a bore 11 lengthwise of the block to accommodate a tube 12 terminating at one end in a valve head 13, and at the other end extending beyond the corresponding end of the block and terminating in a threaded extremity 14 designed to receive a nut 15, confining a spring 16 about the tube 12 and between the nut 15 and the adjacent end of the block 6.

Extending lengthwise through the tube 12 is a rod 17 movable therealong and terminating at one end in a valve head 18 adapted to a seat 19 in the head 13 at the corresponding end of the tube 12. In the block 6 there is formed a chamber 20 traversed by the tube 12 and formed adjacent to the head 13 with a valve seat 21 opening to the atmosphere and adapted to seat the head 13. Extending through the tube 12 is a port or ports 22 serving as a means of communication between the chamber 20 and the interior of the tube 12, for the equalization of air in the tube 12, whether or not the valve 13 be open or removed from its seat 21.

The rod 17 is prolonged beyond one end of the tube 12 and the threaded end 14 thereof, and there receives a spring 23 bearing at one end against the tube 12, or nut 14, and at the other end against a washer 24 held on the rod 17 by a pin 25 traversing the rod. The end of the rod 17 adjacent to the valve 18, is pivotally connected to a rock lever 26 connected by a pivot 27 to a support or bar 28 fixed to a post 29 rising from the block 6. The post 29 has an overhang 30 with ratchet teeth 31 formed therein to engage other ratchet teeth 32 on a lever 33 arranged to rock about a pivot 34 at the upper end of the lever 26.

The lever 33 has a short arm 35 connected to one end of a rod 36 continued through the foot-board 37 in the operator's pit of the automobile, where it is provided with a push pedal 38 under the control of the spring 39.

The springs 16 and 23 are enclosed and protected by a casing 40 held to the block 6, or a part thereof, by a set-screw 41, whereby access to the springs may be had when needed.

Figure 2:
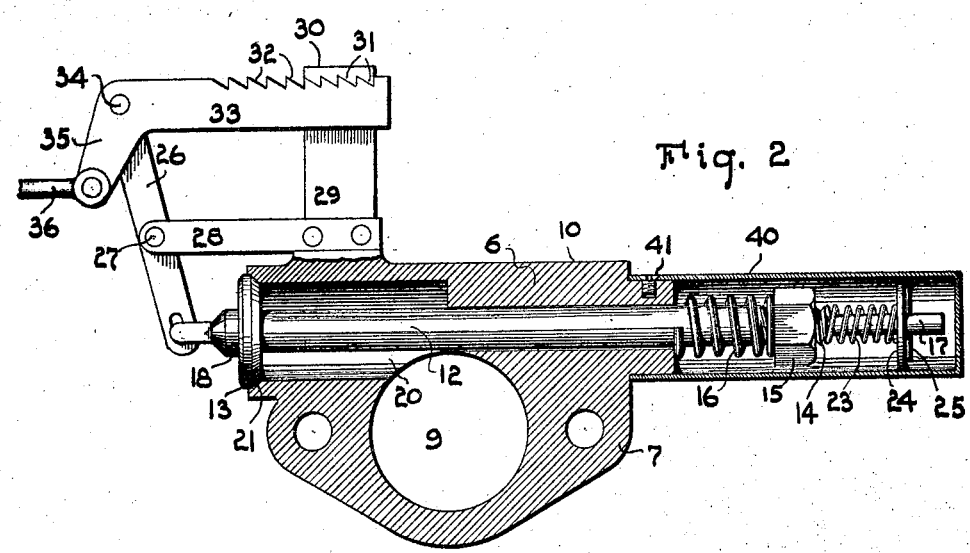
Fig. 2 is a longitudinal vertical section of the fuel saving and braking attachment, with the parts all in the neutral position.

When the gas saver and brake are not in action, the parts have the positions shown in Figs. 1 and 2, that is the tube 12 is withdrawn by the spring 16 and the rod 17 is withdrawn by the spring 23, both springs being then in the expanded position. The valve 13 is lodged in the seat 21 and the valve 18 is lodged in the seat 19, whereby no additional air reaches the passage 9, and consequently the fuel saver or brake, or both, remain inoperative.

So long as it is not desired to utilize either the gas saving structure or the braking structure, or both, the operator does not touch the pedal 38. If it be desired to utilize the gas saving feature of the invention, the operator presses his foot upon the pedal 38, compressing the spring 39, and thereby moving the rod 36 forwardly. The lever 33 will thus be advanced, the ratchet teeth 32 slipping past the ratchet teeth 31, and the lever 26 will be rocked to move the valve 18 from its seat 19, as shown in Fig. 3, the spring 23 compressing to permit this movement.

The spring 23 is much lighter than the spring 16, and consequently compression of the spring 23 does not materally affect the tube 12 until the valve 18 has become unseated and the spring 23 has reached about the limit if its compression. During this movement the parts reach the position shown in Fig. 3, and atmospheric air is drawn in by the suction of the engine through the valve seat 19, escaping through the holes or ports 22, into the chamber 20, and thence into the passage 9, carrying the enriched mixtures representing the charges, but with these charges diluted, more or less, before reaching the engine.

The condition just described will sufficiently dilute the normal charges of fuel to permit a material saving in the fuel supply.

Suppose now, that the automobile is running down hill or coasting, the pedal 38 is pressed to a greater extent than at first, whereupon the spring 23 becomes wholly compressed and bears with force enough upon the corresponding end of the tube 12 to produce a pressure upon the spring 16 to move the valve 13 from its seat 21. Under these circumstances an abundance of air is admitted to the chamber 20 and thence into the passage 9, so diluting the charges that they no longer become effective to explode, and the structure then operates as an ordinary air pump resisting the reciprocation of the engine pistons so that the engine is braked, and cannot run away or acquire undue speed.

It will be noted that as the teeth 32 advance past each tooth 31, the lever 33, upon further advance of rod 36, will momentarily rock about the pivot 34 without rocking the lever 26. This results in an intermittent or step by step movement of the valves, while the rod 36 advances, and consequently there will be a number of definite positions to which the valves may be adjusted, corresponding to the number of teeth 31 and 32, these positions being determined by the engagement of the vertical edges of the teeth 31 and 32 with each other.

The action of the attachment either for fuel saving or for braking, may be controlled at will and to varying extents; and not only is there a saving in fuel because of the dilution of the fuel charges, but there is a saving in the matter of brake linings since the braking effect is due to the action of the engine as an air brake.

What is claimed is:—

1. In an explosion engine, means for diluting the propelling charges with air to economize fuel, comprising a passage between the atmosphere and the intake manifold of the engine, a valve in the passage, said valve having a port therethrough, and another valve associated with the port, the first named valve being timed to open later and to a greater extent than the last named valve, whereby to direct so large a quantity of air to the engine cylinders as to neutralize the explosiveness of the charge and convert the engine into an air pump for braking purposes.

2. In an explosion engine, an attachment for supplying air to the engine cylinders between the intake manifold and the discharge end of the carbureter, comprising a chamber, a spring controlled reciprocatory tubular member traversing the chamber, a spring controlled rod reciprocable within the tubular member, both the rod and tubular member having valves individual thereto for controlling the flow of air from the atmosphere to the manifold, and actuating means for the rod and tubular member timed to operate in succession, whereby the valved rod may first be opened and then the valved tube may be opened with the movements occurring in succession.

3. In an explosion engine, an attachment for introduction between the carbureter and intake manifold of the engine, comprising a block with a chamber therein communicating with the atmosphere and with the intake manifold, a reciprocatory tube extending through the chamber and provided with a valve at one end for controlling the communication between the chamber and the atmosphere, said valve having a port therethrough, a rod reciprocable within the tube and provided with a valve having a seat in the port through the valve at the end of the tube, springs individual to the rod and tube and of different strengths to cause the valves to seat independently, and mechanism under the control of an operator for controlling the valves in succession.

4. In an explosion engine, an attachment for introduction between the carbureter and intake manifold of the engine, comprising a block with a chamber therein communicating with the atmosphere and with the intake manifold, a reciprocatory tube extending through the chamber and provided with a valve at one end for controlling the communication between the chamber and the atmosphere, said valve having a port therethrough, a rod reciprocable within the tube and provided with a valve controlling said port, springs individual to the rod and tube and of different strengths to cause the valve to seat independently, and mechanism under the control of an operator for opening the valves in succession, said mechanism comprising a rock lever connected to the rod, and an angle lever pivoted to the first named lever, means for locking the angle lever, and an operating rod for rocking the angle lever and extended to a point within the reach of an operator.

5. In an explosion engine, the combination with the carbureter and intake manifold, of a body having a passage in communication with the carbureter and a chamber in communication with the passage and also adapted to be put in communication with the atmosphere, a valve for closing communication between said chamber and the atmosphere, means for maintaining the valve normally closed, a port through the valve for supplying the chamber with a limited supply of air, a second valve for controlling said port, means for maintaining the second valve normally closed, and means for opening the said valves in succession with the second mentioned valve opened first.

6. In an explosion engine, the combination with the carbureter and the intake manifold, of a body having a chamber in communication with the carbureter at one end and opening into the atmosphere at the other end, a valve for controlling communication between the chamber and the atmosphere, said valve having a hollow stem, a spring for maintaining the valve normally closed, said valve when opened admitting a large amount of air to said chamber, a port through said valve for admitting a smaller amount of air to the chamber, a smaller valve for controlling said port having a stem within the stem of the first-mentioned valve, a spring normally maintaining the smaller valve closed, the spring for the smaller valve being weaker than the spring for the first-mentioned valve, and means for opening the valves in succession against the action of the springs by a progressive movement of said means, the second-mentioned valve being operated first to admit a relatively small amount of air to the chamber and the first-mentioned valve being later operated to admit a relatively large amount of air to the chamber.

7. In an explosion engine, the combination with the carbureter and the intake manifold, of a body having a passage leading to the carbureter and a chamber in communication with said passage opening at one end into the atmosphere, and a valve for closing said end of the chamber, said valve, when opened, allowing a large amount of air to be admitted to said chamber, a tubular member carrying said valve, a spring for said tubular member to maintain the valve normally closed, ports provided in said tubular member in communication with the chamber between said valve and said passage, a rod operating within said member and carrying a valve at its outer end closing the outer end of said member beyond the first mentioned valve, the inner wall of the tubular member between the ports and second-mentioned valve being spaced from the rod to provide communication between the chamber and the second-mentioned valve, a spring for said rod to maintain the second-mentioned valve normally closed, the last-mentioned spring being weaker than the first-mentioned spring, lever mechanism connected to said rod, and a pedal connected with said lever mechanism whereby the progressive actuation of said pedal causes the unseating of the second-mentioned valve first and then the unseating of the first mentioned valve.

8. In an explosion engine, the combination with the carbureter and the intake manifold, of a body having a passage leading to the carbureter, said body having a valve for supplying the passage with air to dilute the fuel charges for the engine, another valve for increasing the amount of air supplied to said passage for braking the engine, and mechanism for operating both of said means in succession, said mechanism including a pedal, a rod reciprocable thereby, and means transmitting an intermittent opening movement to the respective valves by a constant movement of the rod.

9. In an explosion engine, a body having an air inlet passage, a reciprocable valve for controlling the admission of air thereto, a rock arm connected at one end to the valve, a bell crank pivotally mounted on the other end of the rock arm, a reciprocable rod connected to one end of the bell crank, a member rigidly connected with the body and having ratchet teeth, and cooperating ratchet teeth on the other arm of the bell crank having sliding engagement with the teeth on the rigidly connected member, whereby a continuous advance of the rod will transmit an intermittent movement to the valve.

In testimony, that I claim the foregoing as my own, I have hereto affixed my signature.

THOMAS R. WATSON.